March 21, 1961 R. G. SCHINDLER 2,975,536
GATE
Filed Oct. 16, 1959 2 Sheets-Sheet 2

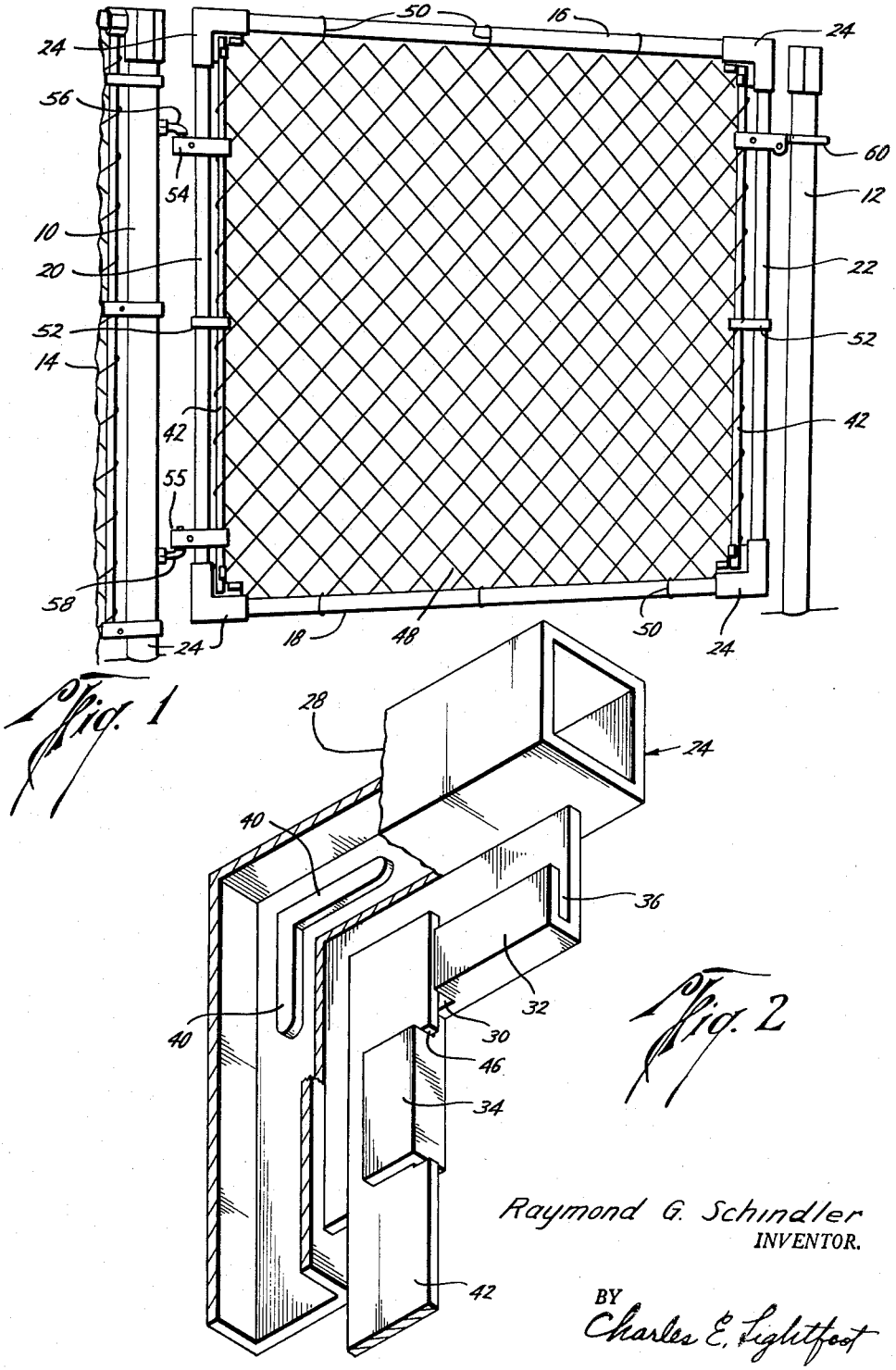

Raymond G. Schindler
INVENTOR.

BY Charles E. Lightfoot
ATTORNEY

United States Patent Office 2,975,536
Patented Mar. 21, 1961

2,975,536
GATE

Raymond G. Schindler, 9600 Old Katy Road, Houston, Tex.

Filed Oct. 16, 1959, Ser. No. 846,941

1 Claim. (Cl. 39—87)

This invention relates to gates for fences, and more particularly to a gate for metal fences of the mesh or chain-link type.

The invention finds particular utility in connection with fences which are constructed entirely of metal having metal posts and rails upon which a woven or chain-link mesh is supported. In the construction of fences of this type it is often desirable to provide gates constructed of the same materials and which present a uniform appearance and structure to the fence.

Heretofore it has been customary, in constructing gates for fences of this kind to provide a gate frame of rectangular shape having upper and lower horizontal rails and vertical end frame members which are connected together at the corners by means of corner fittings and upon which the mesh of the fence is mounted by means of vertical or horizontal rods threaded through the openings of the mesh and connected at their ends to the corner fittings to secure the mesh in place in the frame. The corner fittings and mesh securing rods in gates of this kind, as customarily constructed heretofore, have usually been connected together by welding or bolting, which involves a large expenditure of time and labor, and the use of various kinds of special equipment.

The present invention has for an important object the provision of a gate structure in which the parts are adapted to be assembled and secured together without welding or bolting and without the use of special equipment.

Another object of the invention is to provide a gate which may be conveniently furnished in a disassembled condition and whose parts are easily assembled at the location where the gate is to be used without the use of special tools or fastening means.

A further object of the invention is the provision of a gate having side and end rails and corner fittings which are constructed to be easily assembled to form a frame, and also having means for securing a wire or chain link mesh to the frame, which means also serves to secure the parts together.

Another object of the invention is to provide a gate having a frame including corner fittings which are interchangeable and tie rods which may be positioned horizontally or vertically to secure the corner fittings together and which also serve as securing means for a mesh which covers the frame.

A further object of the invention is the provision of a gate which is of simple design and rugged construction and which may be economically manufactured.

The above and other important objects and advantages of the invention may best be understood from the following detailed description, constituting a specification of the same, when considered in conjunction with the annexed drawings, wherein—

Figure 1 is a front elevational view illustrating a preferred embodiment of the gate of the invention showing the same mounted on a fence;

Figure 2 is a perspective view, partly broken away and partly in cross-section and on an enlarged scale showing a corner fitting of the gate of the invention and one way in which the fitting is used;

Figures 3, 4:
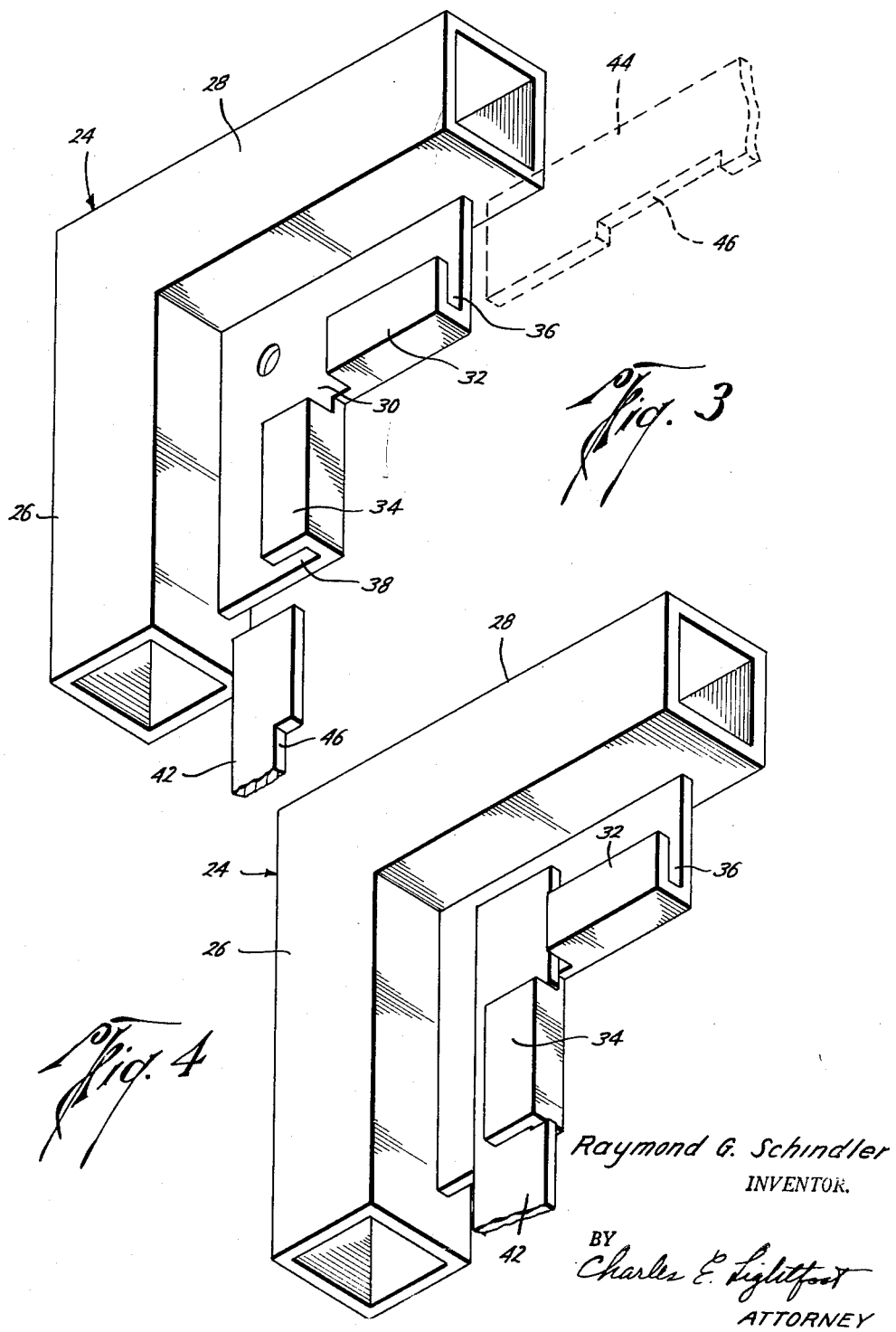

Figure 3 is a perspective view, on an enlarged scale, of a corner fitting of the gate showing the structure of the fitting and the tie rod used with the same and illustrating the manner in which the parts may be assembled, and Figure 4 is a view similar to that of Figure 3 showing the fitting with a tie rod fitted in place thereon and the manner in which the fitting and tie rod coact to secure the parts together.

Referring now to the drawings in greater detail the invention is disclosed herein for purposes of illustration in connection with its use in metal fences of conventional construction having upright metal posts 10 and 12 which support a metallic mesh 14, it being understood that the gate of the invention is capable of application also to fences of various kinds.

The gate of the invention comprises a frame of generally rectangular shape having top and bottom rails or side frame members 16 and 18, respectively, and end frame members 20 and 22, whose ends are fitted into corner fittings 24 at the corners of the frame. The side and end frame members may conveniently be of tubular formation.

Each of the corner fittings 24 is of generally tubular construction and of angle shape, having the tubular portions or arms 26 and 28, which are connected together at right angles to form sockets into which the ends of the side and end frame members may be extended in assembling the gate.

The tubular portions of the corner fittings may conveniently be of rectangular shape in cross-section or may be of some other shape such as circular, depending upon the cross-sectional shape of the side and end frame members with which the fitting is to be used.

Each of the corner fittings is provided with a flat inner gusset or web 30, positioned parallel to the axes of the arms 34 and 36, and which is provided with overturned or bent marginal portions 32 and 34 forming slots 36 and 38, positioned in parallel relation to and opening toward the arms 28 and 26, respectively, in spaced relation thereto.

The corner fittings may conveniently be formed of metal by casting, and may be provided with internal projections or lugs 40, as shown in Figure 2, located inside of the tubular arms 26 and 28, spaced inwardly from the open ends of the arms to serve as stops to limit the distance to which the ends of the side and end frame members may be inserted in the arms. The corner fittings are adapted to be connected together by tie rods such as those indicated at 42, which may extend vertically at each end of the gate, or similar tie rods such as that shown at 44 in dotted lines in Figure 3 which extend horizontally between the corner fittings at the top and at the bottom of the gate. The tie rods may take the form of flat metal bars formed with side notches 46 near each end. The tie rods are of a width somewhat less than the distance between bottoms of the slots 36, 38 and the adjacent side walls of the arms 26, 28, and the thickness of the tie rods is slightly less than the width of the slots 36 and 38, to permit the tie rods to be inserted into the slots to engage the overturned portions 32, 34 with the tie rods in the notches 46 to interlockingly connect the tie rods and corner fittings.

By making the end frame members 20 and 22 and the vertical tie rods 42 of proper length, with the notches 46 of the tie rods properly located, it will be apparent that the portions 34 of the corner fittings will be engaged in the notches 46 with the ends of the end frame members in abutment with the stops 40, when the gate is assembled, so that the corner fittings will be securely held on the end frame members. Similarly, the top and bottom rails 16 and 18, when of the proper length, may be assembled with the top and bottom corner fittings and horizontal tie rods 44, as an alternative way of securing the parts together.

The tie rods 42 are threaded through the wire mesh 48, along the vertical margins thereof to stretch the mesh in place in the frame of the gate, the mesh being attached to the upper and lower rails 16 and 18 by any convenient means, such as wire loops 50 surrounding the rails at conveniently spaced intervals. When the horizontal tie rods 44 are employed instead of the vertical tie rods 42, the tie rods 44 are similarly threaded or looped through the upper and lower marginal portions of the mesh 48 to stretch the mesh in place in the frame.

Additionally, the tie rods may be secured to the frame members, as by means of clips or straps 52 of any conventional design.

The gate is provided with upper and lower hanger elements 54 and 55, of conventional design, clamped to the end frame member 20 and the adjacent tie rods 42. These hanger elements being engageable with suitable angle bolts 56 and 58, carried by the fence post 10 to support the gate for horizontal swinging movement. The gate may be provided with the usual latch mechanism 60 releasably engageable with the fence post 12 to hold the gate closed.

It will be apparent that the invention constructed as described above, provides a boltless gate, which is easily assembled without the use of special tools or equipment, thus substantially reducing the time and labor involved.

The invention is disclosed herein in connection with a certain specific embodiment of the same, but it will be understood that this is intended by way of illustration only, and that various changes can be made in the construction and arrangement of the parts without departing from the spirit of the invention or the scope of the appended claim.

Having thus clearly shown and described the invention, what is claimed as new and desired to secure by Letters Patent is:

A gate comprising side and end frame members, corner fittings formed with portions into which the ends of the members may be inserted at the corners of the gate to form a generally rectangular frame, tie rods positioned in the frame along two opposite ones of said members, interengageable means on the tie rods and fittings positioned in inter-engagement holding the fittings on the ends of said two opposite ones of said members and a wire mesh positioned in the frame and connected to the tie rods to hold the fittings on the opposite ends of the other two opposite ones of said members.

References Cited in the file of this patent
UNITED STATES PATENTS 2,763,890    Cox _____ Sept. 25, 1956

FOREIGN PATENTS 811,493    Great Britain _____ Apr. 8, 1959